Sept. 18, 1951   R. E. STURM ET AL   2,567,977
ELECTRIC TRIP CIRCUIT
Original Filed Aug. 24, 1946
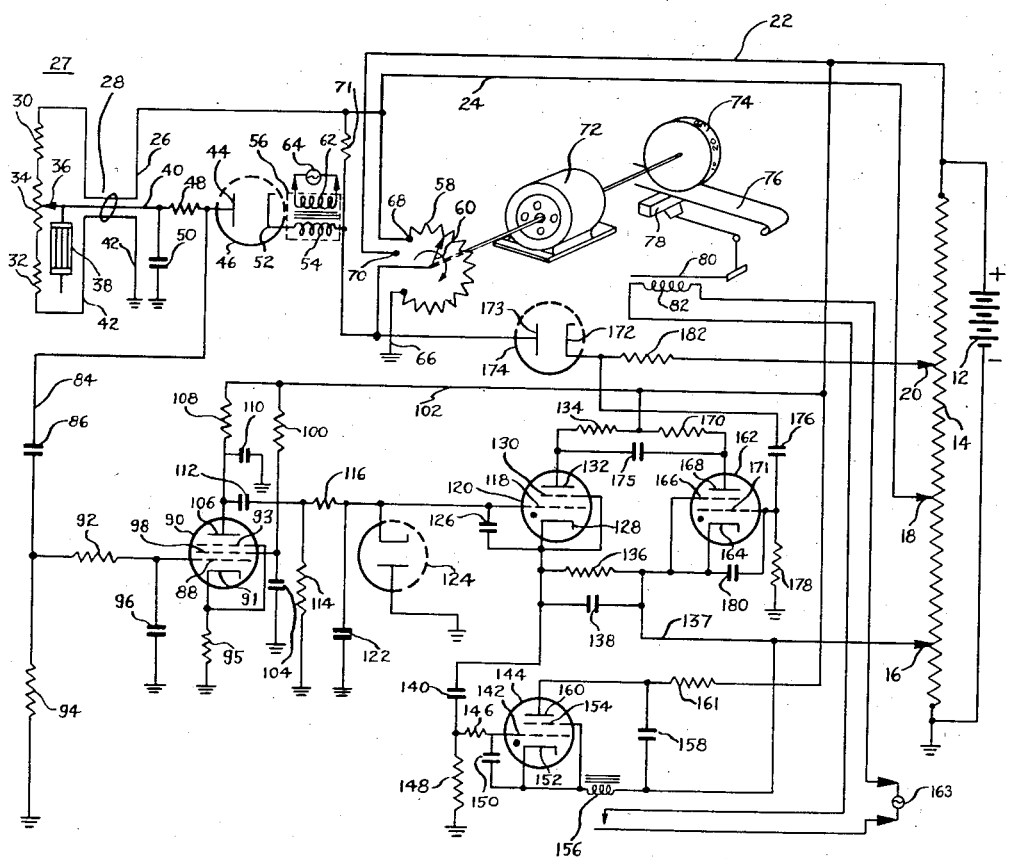
Inventors
RALPH E. STURM
JAMES R. COSBY
By George V Ettyroth
Agent Patented Sept. 18, 1951

2,567,977

UNITED STATES PATENT OFFICE 2,567,977

ELECTRIC TRIP CIRCUIT

Ralph E. Sturm, Pikesville, and James R. Cosby, Towson, Md., assignors to Bendix Aviation Corporation, Baltimore, Md., a corporation of Delaware Original application August 24, 1946, Serial No. 692,892. Divided and this application October 21, 1947, Serial No. 781,228

5 Claims. (Cl. 250—27)

This application is a division of our application Serial No. 692,892, filed August 24, 1946, now Patent No. 2,525,841, for improvements in electrical measuring circuits.

This invention relates to electrical trip circuits characterized by the presence of a plurality of differing states of equilibrium which may be assumed under the influence of control impulses and, more particularly, to an improved arrangement for such trip circuits in which provisions are made for eliminating response to impulses of undesired polarity, and the restoring operation is controlled through a voltage amplitude responsive conductor.

There are a number of electrical configurations known to the art characterized by the possibility of the existence of any one of a number of mutually exclusive states of electrical equilibrium assumed in response to the application of the necessary electrical stimuli. Such circuits are conveniently referred to herein as trip circuits, for the regions intermediate the states of equilibrium are unstable, causing the circuit to pass quickly from one state to another providing discontinuous and instantaneous response. The time between changes in the equilibrium state is frequently employed as a measure of some quantity under observation which has been translated into the form of electrical impulse spacing. For the start of the measurement, it is necessary that the circuit always be restored to a reference condition and this is done by the application of a suitable electric impulse to the restoring terminal. The completion of the measuring operation is signaled by the change in state resulting from the arrival of a trip impulse.

Numerous such systems are known wherein the trip and restoring impulse are transmitted over separate sets of conductors or over different transmission paths on the same group of conductors. The multiplicity of connections required in such instances entails additional expense and problems of installation which would be eliminated by a device in which the same transmission path over the same set of conductors is employed for the trip and restoring operations.

Accordingly, it is a primary object of the invention to provide an electrical trip circuit which may be tripped and reset over the same conductor pair via the same transmission path.

It is a further object of the invention to provide electric trip apparatus in which the chance of a trip operation is minimized during the reset operation and vice versa.

Still another object of the invention is to provide electric trip apparatus in which the separation of trip and restoring impulses takes place in stationary structures.

Other objects and advantages of the invention will in part be described and in part be obvious when the following specification is read in conjunction with the drawing in which the single figure illustrates schematically the electrical circuits of a device embodying the principles of the invention.

A plurality of thermionic valves is illustrated, each provided with an electron emissive cathode brought to operating temperature by an associated heater. Neither the heaters nor the circuits for energizing same have been illustrated in the interest of preserving simplicity of presentation, since any of the many conventional heater configurations may be successfully employed.

In the circuit illustrated, operating potentials are derived from the battery 12 having its negative terminal connected to ground and its positive terminal connected to one end of a voltage divider 14, the other end of which is also grounded. The voltage divider 14 is tapped at several intermediate points to provide a number of operating voltages whose purpose will be evident from their names and from the following descriptive material. The lower tap 16 serves to provide operating bias for three discharge valves and may hence be termed the bias tap 16. Next in the order of increasing positive potential there is the measuring circuit tap 18 supplying energy to the measuring bridge. In practice the voltage of measuring tap 18 with respect to ground has been set at approximately 50 volts.

The next higher voltage tape is the reset blocking tap 20 which may have a potential of approximately 100 v. with respect to ground. This voltage prevents operation of the reset circuit during the measuring cycle. Line 22 is at the battery terminal potential, which may be 150 volts.

Voltage from the measuring circuit tap 18 passes through lead 24 and lead 26 in the measuring station cable 28 to a measuring station 27 which may contain fixed resistors 30 and 32 in series with a potentiometer 34 having a movable tap 36 adapted for actuation by hair element 38. As the hair element changes in length, tap 36 moves to and fro over potentiometer 34 varying the potential applied to lead 40 running through and from the measuring station cable 28. The ground circuit return for the measuring station is provided by lead 42 running through cable 28 to the chassis of the voltage comparing portion of the apparatus.

It will be apparent that the element so far described is one for translating changes in humidity into changes in electric voltage. Variables other than humidity may be similarly measured by use of appropriate condition responsive elements driving variable resistors or by the use of resistors or other circuit elements themselves directly responsive to the condition being monitored.

The lead 40 from the measuring station is connected with the anode 44 of the diode 46 through a bridge signal resistor 48, shunted at its cable end by a capacitor 50 to minimize the response of the apparatus to stray electric transients appearing in the cable 28. There is associated with anode 44 a thermionic cathode 52 connected through secondary 54 of transformer 56 to the movable arm 60 of a search voltage potentiometer 58. The primary 62 of transformer 56 may be energized from any suitable alternating current source 64 to impress on cathode 52 a corresponding alternating voltage.

One terminal of the winding of search voltage potentiometer 58 is grounded at 66 while the other terminal 68 is connected to the measuring voltage line 24. The resistive element of potentiometer 58 occupies less than the entire 360° arc and an auxiliary contact 70 connected with the battery line 22 is situated within the unused portion of the arc. A motor 72 drives the potentiometer arm 60 continuously in a clockwise direction, as indicated, whereby the arm 60 successively engages the entire length of the winding of potentiometer 58 and momentarily engages the auxiliary contact 70 during its passage thereby. A character bearing disk 74 is rotated synchronously with potentiometer arm 60 by motor 72 and a printed strip 76 associated with the character bearing wheel 74 is periodically driven into engagement with the characters on 74 by a striker bar 78 which is displaced as a result of the movement of armature 80 of solenoid relay 82 when said relay is energized.

During the period when the arm 60 is out of engagement with the other portions of the potentiometer 58, the arm is maintained at the maximum positive measuring circuit potential by the connection of a stabilizing resistor 71, of the order of a megohm or more, between arm 60 and the measuring voltage line 24.

The signals from the balance responsive circuit pass through lead 84 and coupling capacitor 86 to the control grid 88 of amplifier valve 90 through a resistor 92. The junction of capacitor 86 and resistor 92 is connected to ground through the grid leak resistor 94, and the control grid end of resistor 92 is shunted to ground by a filter capacitor 96. The amplifier valve 90 has a cathode 91 connected to a suppressor grid 93 and grounded through cathode resistor 95 to provide operating bias on control grid 88. A space charge grid 98 is situated intermediate control grid 88 and suppressor grid 93, and energized from the battery line 22 through dropping resistor 100 and lead 102. The power supply to space charge grid 98 is filtered for alternating components by the connection of capacitor 104 between the grid 98 and ground.

An anode 106 is located exteriorly of the element assembly so far described in connection with vacuum tube 90 and connected with the battery line 102 through a load resistor 108. Anode circuit filtering discriminating against transient signal components is afforded by the connection of capacitor 110 between the anode 106 and ground. Signals appearing in the anode circuit of valve 90 are transferred to subsequent stages through the coupling capacitor 112 connected between anode 106 and a grid leak 114 having its remote end grounded. A limiting resistor 116 connects the junction of capacitor 112 and grid leak 114 to the control grid 118 of a gaseous discharge trip valve 120. The control grid 118 is shunted to ground by filter capacitor 122 and by a diode 124 so poled that the control grid 118 is restrained from becoming negative with respect to ground. Improved stability is afforded by the connection of a capacitor 126 between control grid 118 and the thermionic cathode 128 of discharge valve 120. A shielding grid 130, situated within discharge tube 120 intermediately of control electrode 118 and anode 132, is directly connected electrically with cathode 128. The anode 132 of the trip valve 120 is connected with the battery line 102 by a resistor 134 and the high voltage anode circuit is completed by the connection of a cathode resistor 136 between cathode 128 and bias tap 16 via line 137. Cathode resistor 136 is shunted by capacitor 138 to improve the commutating properties of the two tube back to back coupled flip-flop circuit as more fully described in the copending application of James R. Cosby, filed August 8, 1946, Serial No. 689,109, now Patent No. 2,549,667.

The flip-flop circuit resetting is performed by reset valve 162 having a cathode 164 connected through lead 137 to the bias tap 16 and having a shield grid 166 connected directly to cathode 164. On the side of shield grid 166 remote from cathode 164 there is situated an anode 168 which is connected to battery line 102 through anode resistor 170. Anode 168 of reset valve 162 is coupled to anode 132 of trip valve 120 by commutating capacitor 175 connected therebetween.

A control grid electrode 171 situated between cathode 164 and shield grid 166 serves to control the discharge within the reset valve 162 in response to signals arriving through capacitor 176 connected between control grid 170 and the cathode 172 of the reset diode 174. A direct current return path for control grid 171 is provided by leak resistor 178 connected between control grid 171 and ground.

Again undesired response to stray electric transients is prevented or minimized by a capacitor 180 shunted between control grid 171 and cathode 164.

It may be noted in passing that no appreciable impedance is inserted in the return circuit from cathode 164 and bias tap 16, thus permitting the omission of the precautionary circuit features described in the aforementioned copending application at this point in the circuit. However, the resistor 136 in the cathode return of trip valve 120 gives rise to a positive trigger pulse at the moment of breakdown of trip valve 120. A capacitor 140 connected between cathode 128 of trip valve 120 and the ungrounded end of grid leak resistor 148 impresses the trigger pulse occurring in this portion of the circuit on the control grid 142 of relay control valve 144 through the limiting resistor 146. The relay control valve 144 may, like the tubes in the previously described flip-flop circuit, be of the gaseous-filled type commercially designated "Thyratron." A shield grid 154 within the relay control valve 144 is directly connected with the thermionic cathode 152, and exterior to this electrode assembly there is situated an anode 160 connected with the positive terminal of the anode source 12 by the limiting resistor 161. The winding of a relay 156 connects cathode 152 with bias tap 16 and a reservoir or storage capacitor 158 is shunted between anode 160 and the tap end of the winding of relay 156. A capacitor of 4 mfd. has been found adequate for the storage capacitor 158. The relay 156 carries a pair of normally open contacts connected in series with the solenoid relay 82 and a tapper bar energizing source 163. In practice the tapper bar energizing source 163 and the balance signal source 64 may be the same, but there may exist conditions making it desirable to use commercial line frequencies in the circuit of tapper bar energizing source 162 and some other different frequency for the balance signal source 64 to prevent interference of the power circuits with the balance signal circuits.

The reset diode 174, previously referred to, is arranged in a circuit such that a reset impulse is applied to control grid 171 only during the passage of the arm 60 across the reset tap 70 on potentiometer 58. The cathode 172 of diode 174 is returned to the reset blocking tap 20 through a resistor 182 and the anode 173 of diode 174 is connected with the rotating arm 60 of potentiometer 58. As the positive potential applied to cathode 172 from reset blocking tap 20 is higher than the maximum positive potential existing at any point on the winding of potentiometer 58, there can be no passage of electric current through the reset diode 174 during the measuring portion of the operating cycle. For a portion of its rotation, the arm 60 "floats" which is to say that it is disengaged electrically from all portions of potentiometer 58. During this period, the anode 173 has its potential fixed by the leak resistor 71 connected between arm 60 and measuring circuit tap 18. The arm 60 and its associated circuits is thereby held at a potential low enough to prevent conduction through the reset diode 174 and, at the same time, high enough to also prevent conduction through the balance sensing diode 46.

With the foregoing mutually cooperative relationship of the parts in mind, the operation of the apparatus may now be readily understood. The motor 72 drives the potentiometer arm 60 and printer wheel 74 continuously. The lead 40 impresses on anode 44 a direct current potential indicative of conditions existing at the measuring station 27. This potential will always lie between 0 and 50 volts. As the arm 60 of potentiometer 58 is rotated, it impresses on cathode 52 of the balance signal diode 46 a search potential varying periodically from 0 to 50 volts in smooth continuous fashion, the search voltage starting at 50 volts positive with respect to ground and decreasing gradually to 0. At some point during this variation, the voltage at cathode 52 becomes very nearly equal to that existing at anode 54, whereupon the alternating potentials superimposed on cathode 52 periodically drive cathode 52 negative with respect to anode 54 producing a pulsating current in the lead attached to anode 44. These pulses develop a corresponding pulsating voltage across the bridge signal resistor 48 which passes through the signal amplifier valve 90 where its voltage excursions are amplified and then impressed on the trip valve 120. A discharge is now initiated in the valve 120 producing a positive pulse in its cathode circiut which then initiates a discharge in relay control valve 144. Breakdown of the relay control valve 144 discharges reservoir capacitor 158 through relay 156, momentarily closing the contacts of relay 156 and instantaneously energizing the solenoid 82 from source 162 to drive the tapper bar 78 against the printing strip 76, carrying it into engagement with the printer wheel 74 to print on the strip 76 a figure indicative of the angular position of arm 60 of the potentiometer 58 at the time when the search voltage developed from potentiometer 58 was equal to the measuring station output. As a given measuring station output voltage corresponds to a predetermined value of the condition under measurement, the printer wheel may be directly calibrated to indicate the condition value at this time.

Continuing rotation of potentiometer arm 60 decreases the direct current voltage component at 52 still further, thus increasing the signal input to control grid 118 of trip valve 120. The control grid 118 is alternately driven positive and negative. The anode current passing through the trip valve 120 is limited by resistors 134 and 136 and, hence, there is danger that the application of negative signals to control grid 118 may interrupt the discharge flowing through the trip valve 120, which might give rise to successive erroneous printing operations. The possibility of such an occurrence is eliminated by the connection of clamping diode 124 between control grid 118 and ground with the diode anode connected to ground. Upon the arrival of a signal of negative polarity at grid 118, conduction in the diode 124 is established to limit the negative signal excursion and prevent the interruption of the arc discharge within trip valve 120.

Continuing rotation of the potentiometer arm 60 disengages the arm 60 from the active elements of the potentiometer. At this time, current flowing through stabilizing resistor 71 brings the potential of arm 60 and its associated circuits to the maximum measuring circuit potential, approximately 50 volts, with respect to ground. This potential insures that alternating current signal transmission through the balance signal diode 46 is prevented and, at the same time, maintains anode 173 of the reset diode 174 negative with respect to its cathode 172, preventing operation of the reset circuit. With the further movement of the potentiometer arm 60, the reset contact 70 is traversed, momentarily raising the arm circuit potential to the full anode supply voltage of 150 volts, swinging anode 173 positive with respect to cathode 172 to develop across reset diode load resistor 182 a 50-volt pulse triggering the reset valve 162 through coupling capacitor 176 to establish a discharge in the reset valve 162 and extinguish that in trip valve 120. This arm voltage of 150 volts carries the cathode 52 of balance signal diode 46 still further positive with respect to its associated anode, preventing operation of the signal circuit at this time. This prepares the circuit for a repetition of the measuring operation which is initiated with the re-engagement of the winding of potentiometer 58 by the potentiometer arm 60 in its subsequent rotation.

Values of circuit components which have been found suitable for making observations at the rate of 2 per minute follow:

Balance signal resistor 48, 220,000 ohms
Line filter capacitor 50, 1 mfd.
Stabilizing resistor 71, 10 megohms
Coupling capacitor 86, .05 mfd.
Limiting resistor 92, 100,000 ohms
Grid leak resistor 94, 220,000 ohms
Grid filter capacitor 96, .01 mfd.
Grid dropping resistor 100, 1.5 megohms
Anode load resistor 108, 220,000 ohms
Anode filter capacitor 110, .01 mfd.
Trip input capacitor 112, .05 mfd.
Trip input grid leak 114, 220,000 ohms
Trip input limiting resistor 116, 220,000 ohms
Trip input filter capacitor 126, 250 mmfd.
Trip anode resistor 134, 220,000 ohms
Trip cathode resistor 136, 10,000 ohms
Trip cathode capacitor 138, .005 mfd.
Trip output coupling capacitor 140, .05 mfd.
Relay control limiting resistor 146, 220,000 ohms
Relay control grid leak 148, 220,000 ohms
Relay control input filter capacitor 150, 250 mmfd.
Storage capacitor 158, 4 mfd.
Limiting resistor 161, 470,000 ohms
Reset anode resistor 170, 220,000 ohms
Commutating capacitor 175, .01 mfd.
Reset input coupling capacitor 176, .05 mfd.
Reset input filter capacitor 180, 250 mmfd.
Reset diode load 182, 220,000 ohms While the trip apparatus illustrated as controlling the operation of the tapper bar incorporates a pair of vacuum tubes, it is to be understood that the use of any type of trip apparatus characterized by at least two conditions of equilibrium separated by a region of instability is contemplated, in which one or the other of the two stable conditions may be established by the application of trip and reset pulses to the proper input terminals. It is further obvious that the device or devices responsive to the output of this measuring circuit may respond as visual indicators or may indicate their response by effecting a control operation. The term indicating device as used herein is intended to embrace both types of operation.

The foregoing has made the essence of the invention clear and there will be apparent to those skilled in the art many modifications and applications which do not distinguish substantially therefrom.

What is claimed and desired to be secured by United States Letters Patent is:

1. In combination with electric trip apparatus sensitive to the polarity of electric pulses applied thereto having trip and restoring terminals and an input terminal, a source of voltage varying in magnitude through a predetermined range connected to said input terminal; means including a first unilaterally conductive impedance connected between said input terminal and said trip terminal for transmitting an electric pulse to said trip terminal, said first impedance being conductive in a first range of voltage of said source and non-conductive in a second range of voltage of said source higher than said first range; means including a second unilaterally conductive impedance connected between said input terminal and said restoring terminal for transmitting an electric pulse to said restoring terminal, said second impedance being conductive in said second range of voltage of said source; and means for impressing a steady bias voltage on said second impedance, said bias voltage being higher than said first range of voltage of said source.

2. In combination with electric trip apparatus sensitive to the polarity of electric pulses applied thereto having trip and restoring terminals and an input terminal, a source of voltage varying in magnitude through a predetermined range connected to said input terminal; means including a unilaterally conductive impedance connected between said input terminal and said trip terminal for transmitting an electric pulse to said trip terminal, said first impedance being conductive in a first range of voltage of said source and non-conductive in a second range of voltage of said source higher than said first range, means including a second unilaterally conductive impedance connected between said input terminal and said restoring terminal for transmitting an electric pulse to said restoring terminal, said second impedance being conductive in said second range of voltage of said source; means for impressing a steady bias voltage on said second unilaterally conductive impedance, said bias voltage being higher than said first range of voltage; and a third unilaterally conductive impedance connected between said first impedance and said trip terminal.

3. In combination with electric trip apparatus having trip and restoring terminals and an input terminal, a source of voltage varying in magnitude through a predetermined range connected to said input terminal; first and second unilaterally conductive devices connected in series in the same sense between said trip and restoring terminals, means connecting the common terminals of said unilaterally conductive devices with said input terminal, said first device being conductive in a first range of voltage of said source for transmitting an electric pulse to said trip terminal and said second device being conductive in a second range of voltage of said source higher than said first range for transmitting an electric pulse to said restoring terminal, said first device being non-conductive in said second range of voltage of said source; and means for impressing a steady bias voltage across said second device, said bias voltage being higher than said first range of voltage.

4. In combination with electric trip apparatus having trip and restoring terminals and an input terminal, a source of voltage varying in magnitude through a predetermined range connected to said input terminal; first and second unilaterally conductive devices connected in series in the same sense between said trip and restoring terminals, means connecting the common terminals of said unilaterally conductive devices with said input terminal; said first device being conductive in a first range of voltage of said source for transmitting an electric pulse to said trip terminal and said second device being conductive in a second range of voltage of said source higher than first range for transmitting an electric pulse to said restoring terminal, said first device being non-conductive in said second range of voltage of said source; means for impressing a steady bias voltage across said second device, said bias voltage being higher than said first range of voltage, and a third unilaterally conductive device connected between said first device and said trip terminal.

5. In combination with electric trip apparatus having trip and restoring terminals and an input terminal, a source of voltage varying in magnitude through a predetermined range connected to said input terminal, means including a first diode connected between said input terminal and said trip terminal for transmitting an electric pulse to said trip terminal, said first diode having its cathode connected to said input terminal; means including a second diode connected between said input terminal and said restoring terminal for transmitting an electric pulse to said restoring terminal, said second diode having its anode connected to said input terminal; said first diode being conductive in a first range of voltage of said source and being non-conductive in a second range of voltage of said source higher than said first range and said second diode being conductive in said second range of voltage of said source; and means for impressing a steady bias voltage across said second diode, said bias voltage being higher than said first range of voltage.

RALPH E. STURM.
JAMES R. COSBY.

REFERENCES CITED

The following references are of record in the file of this patent:

UNITED STATES PATENTS

| Number | Name | Date |
|---|---|---|
| 1,778,465 | Ozanne | Oct. 14, 1930 |
| 1,979,484 | Mathes | Nov. 6, 1934 |
| 2,210,523 | Blumlein | Aug. 6, 1940 |
| 2,211,751 | Humby et al. | Aug. 20, 1940 |
| 2,266,401 | Reeves | Dec. 16, 1941 |
| 2,348,016 | Michel | May 2, 1944 |
| 2,365,450 | Bliss | Dec. 19, 1944 |
| 2,366,038 | Livingston | Dec. 26, 1944 |
| 2,370,178 | Livingston | Feb. 27, 1945 |
| 2,405,930 | Goldberg et al. | Aug. 13, 1946 |
| 2,421,018 | De Rosa | May 27, 1947 |
| 2,425,063 | Kahn et al. | Aug. 5, 1947 |
| 2,432,188 | Bliss | Dec. 9, 1947 |
| 2,442,403 | Flory et al. | June 1, 1948 |
| 2,469,860 | Cockrell | May 10, 1949 |